(12) United States Patent
Van Goor et al.

(10) Patent No.: US 10,314,145 B2
(45) Date of Patent: Jun. 4, 2019

(54) POWER-OVER-ETHERNET LIGHTING SYSTEM

(71) Applicant: SIGNIFY HOLDING B.V., Eindhoven (NL)

(72) Inventors: Dave Willem Van Goor, Eindhoven (NL); Leenart Yseboodt, Eindhoven (NL); Matthias Wendt, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/063,881

(22) PCT Filed: Dec. 2, 2016

(86) PCT No.: PCT/EP2016/079525
§ 371 (c)(1),
(2) Date: Jun. 19, 2018

(87) PCT Pub. No.: WO2017/108372
PCT Pub. Date: Jun. 29, 2017

(65) Prior Publication Data
US 2018/0376567 A1  Dec. 27, 2018

(30) Foreign Application Priority Data
Dec. 21, 2015  (EP) ..................... 15201457

(51) Int. Cl.
*H05B 37/02* (2006.01)
*H02J 9/06* (2006.01)
*H04L 12/10* (2006.01)

(52) U.S. Cl.
CPC .......... *H05B 37/0254* (2013.01); *H02J 9/061* (2013.01); *H02J 9/065* (2013.01); *H04L 12/10* (2013.01); *H02J 2009/068* (2013.01)

(58) Field of Classification Search
None
See application file for complete search history.

(56) References Cited

U.S. PATENT DOCUMENTS 8,214,680 B1    7/2012  Tassinari et al.
2006/0239183 A1*  10/2006  Robitaille ............... G06F 1/266
                                                              370/217

(Continued)

FOREIGN PATENT DOCUMENTS

| EP | 2557657 A2 | 2/2013 |
| GB | 2554987 A | 4/2018 |
| WO | WO2013136242 A2 | 9/2013 |

OTHER PUBLICATIONS

Q. Gao, et al., "Design and Implementation of LED intelligent Lighting System Based on Technology of PoE"., IEEE, Control and Decision Conference (CCDC), 2015m 27th Chinese, pp. 2628-2633.

*Primary Examiner* — Douglas W Owens
*Assistant Examiner* — Jianzi Chen

(57) ABSTRACT

The invention relates to a PoE lighting system (1) comprising an emergency lighting device (4), a first PSE device (6) and a second PSE device (2). The first PSE device is adapted to provide power based on a) first power received from a first power source or b) second power received from a second PSE device via a first fire-resistant PoE connection (3) in case of emergency. The first PSE device is adapted to detect whether power is received from the second PSE device and to provide power to the emergency lighting device based on the second power via a second fire-resistant PoE connection (7), if it has been detected that power has been received from the second PSE device. This can allow for a provision of PoE emergency lighting in case of fire, even if a communication via the fire-resistant PoE connections is not possible anymore.

9 Claims, 3 Drawing Sheets

(56) References Cited

U.S. PATENT DOCUMENTS

| | | | |
|---|---|---|---|
| 2007/0263333 A1* | 11/2007 | Apfel | H02H 9/041 |
| | | | 361/91.1 |
| 2008/0218330 A1 | 9/2008 | Biles et al. | |
| 2009/0073957 A1 | 3/2009 | Newland et al. | |
| 2012/0326608 A1 | 12/2012 | Mohan et al. | |
| 2015/0127957 A1 | 5/2015 | Sethi | |
| 2016/0036268 A1* | 2/2016 | Laherty | H02J 7/0068 |
| | | | 307/19 |
| 2016/0273722 A1* | 9/2016 | Crenshaw | H02J 7/0021 |

* cited by examiner

POWER-OVER-ETHERNET LIGHTING SYSTEM

CROSS-REFERENCE TO PRIOR APPLICATIONS

This application is the U.S. National Phase application under 35 U.S.C. § 371 of International Application No. PCT/EP2016/079525, filed on Dec. 2, 2016, which claims the benefit of European Patent Application No. 15201457.7, filed on Dec. 21, 2015. These applications are hereby incorporated by reference herein.

FIELD OF THE INVENTION

The invention relates to a Power-over-Ethernet (PoE) lighting system and a power source equipment (PSE) device for being used in the PoE lighting system. The invention relates further to a control method and computer program for controlling the PoE lighting system.

BACKGROUND OF THE INVENTION

A PoE lighting system in accordance with the PoE standard IEEE 802.3 can comprise lighting devices connected to a PSE device via Ethernet cables, wherein the PSE device provides power and control data to the lighting devices via the Ethernet cables. The lighting devices then emit light in accordance with the control data by using the power provided by the PSE device. In case of an emergency situation in which heat is generated, especially in case of fire, the connection between the PSE device and the lighting devices may be disrupted such that PoE powered emergency light may not be providable.

SUMMARY OF THE INVENTION

It is an object of the present invention to provide a PoE lighting system which provides light also in case of emergency like fire. It is a further object of the present invention to provide a PSE device for being used in the PoE lighting system and a control method and computer program for controlling the PoE lighting system.

In a first aspect of the present invention a PoE lighting system is presented, wherein the PoE lighting system comprises:
  an emergency lighting device,
  a first PSE device, wherein the first PSE device is adapted to provide power based on a) first power received from a first power source or b) second power received from a second PSE device,
  the second PSE device for providing the second power to the first PSE device via a first fire-resistant PoE connection in case of emergency,
wherein the first PSE device is adapted to detect whether power is received from the second PSE device and to provide power to the emergency lighting device based on the second power via a second fire-resistant PoE connection, if it has been detected that power has been received from the second PSE device.

In case of emergency, especially in case of fire, the second PSE device provides the second power to the first PSE device via the first fire-resistant PoE connection. This provision of the second power is detected by the first PSE device, which indicates to the first PSE device that an emergency situation is present, wherein, in order to cope with this emergency situation, the first PSE device uses the second power received from the second PSE device for powering the emergency lighting device via the second fire-resistant PoE connection. Since the first PSE device uses the second power received from the second PSE device via the first fire-resistant PoE connection for powering the emergency lighting device via the second fire-resistant PoE connection, the emergency lighting device can still provide light, even if in case of emergency the first power cannot be used anymore for powering the lighting devices due to a too strong generated heat which may be caused by a fire.

The PoE lighting system further comprises a non-emergency lighting device, wherein the first PSE device is adapted to provide power to the non-emergency lighting device based on the first power. The first PSE device is preferentially adapted to provide the power to the non-emergency lighting device based on the first power in a normal situation, i.e. in a non-emergency situation, wherein in this normal situation optionally also the emergency lighting device may be powered by using the first power.

The emergency lighting device and the non-emergency lighting device are preferentially lighting devices in accordance with the PoE standard IEEE 802.3. The emergency lighting device and the non-emergency lighting device can be of the same type or they can be of different types, wherein the adjective "emergency" indicates that the PoE lighting system is adapted such that in case of emergency the emergency lighting device provides light, wherein in case of emergency the non-emergency lighting device only optionally provides light, i.e. in case of emergency the non-emergency lighting device may provide light or may not provide light. The first power source can be a mains power source such that the first power can be mains power. The first PSE device can comprise a power supply unit (PSU) which receives the first power, especially the mains power, and transforms the first power to the power to be provided to the non-emergency lighting device and optionally also to the emergency lighting device in a non-emergency situation.

The PoE lighting system can comprise a single emergency lighting device or several emergency lighting devices. Moreover, the PoE lighting system can comprise a single non-emergency lighting device or several non-emergency lighting devices. The PoE lighting system can comprise a single first PSE device or several first PSE devices which can be connected to a same second PSE device or to several second PSE devices. Thus, the PoE lighting system can comprise one or several second PSE devices, wherein one or several first PSE devices can be connected to a respective second PSE device.

The PoE connections are preferentially Ethernet cables, for instance, category 3, 4, 5, 6, 7 or 8 cables or Ethernet cables of another category. The first and second PoE connections are fire-resistant. Preferentially, the fire-resistance refers to the ability of the first and second PoE connections to provide power in case of fire, whereas the data provision may be strongly influenced by the heat generated by the fire due to a changing impedance of the PoE connections. The fire-resistance of the PoE connections may be achieved by using, for instance, PoE cables of a fire-resistant type and/or by mounting PoE cables such that they are fire-resistant.

The second PSE device is adapted to provide control data via the first fire-resistant PoE connection to the first PSE device for controlling the non-emergency lighting device. The first PSE device is adapted to consider the provided control data only, if no power is received from the second PSE device. Thus, the non-emergency lighting device may be controlled by the second PSE device via the first PSE device, wherein by considering the provided control data only, if no power is received from the second PSE device, i.e. only in case of no emergency, it can be ensured that the control data are used for controlling the non-emergency lighting device, only if it can be relied on them. In particular, in case of fire, in which the second power may be reliably received via the second fire-resistant PoE connection, but in which the control data may not be reliably received via the second fire-resistant PoE connection, the control data received from the second PSE device via the second fire-resistant PoE connection may be ignored. This can improve the reliability of the PoE lighting system.

The second PSE device can also be adapted to provide control data to the first PSE device only, if it does not provide the second power to the first PSE device. The second PSE device provides the second power to the first PSE device in case of emergency, wherein in this case the first fire-resistant PoE connection may not be able to reliably transfer the control data to the first PSE device due to large heat. By providing the control data to the first PSE device only, if it does not provide the second power to the first PSE device, it can be ensured that the control data are only sent to the first PSE device, if they are reliable. Also this can improve the reliability of the PoE lighting system.

The first PSE device is preferentially adapted to provide power to the non-emergency lighting device based on the first power, if no power is received from the second power source. In particular, the first PSE device can be adapted to use the first power for powering the non-emergency lighting device, only if no power is received from the second power source. The reception of the second power indicates to the first PSE device an emergency situation, in which the first power may not be usable anymore for powering the non-emergency lighting device. By using the first power for powering the non-emergency lighting device only in a situation, in which the first power can be reliably provided, the reliability of the PoE lighting system can be further improved.

The first PSE device can also be adapted to provide power to the emergency lighting device based on the first power, if no power is received from the second power source. Thus, in a non-emergency situation the first power may also be used for powering the emergency lighting device, thereby allowing the PoE lighting system to provide more light in a normal, non-emergency situation.

In a preferred embodiment the power connection connecting the non-emergency lighting device with the first PSE device is a non-fire-resistant power connection, wherein, if the PoE lighting system comprises fire-resistant PoE connections and non-fire-resistant PoE connections, the fire-resistant PoE connections can be defined by having a fire resistance being larger than the fire resistance of the non-fire-resistant PoE connections. In an emergency situation in which the second power is received by the first PSE device, also the non-emergency lighting device may be powered, at least as long as the PoE connection between the first PSE device and the non-emergency lighting device allows the provision of power to the non-emergency lighting device, thereby providing more light in case of emergency at least until the power connection between the first PSE device and the non-emergency lighting device is disrupted due to heat.

In a further aspect of the present invention a PSE device for being used as the first PSE device in a PoE lighting system as defined in claim 1 is presented, wherein the PSE device is adapted to provide power based on a) first power received from the first power source or b) second power received from the second PSE device, wherein the PSE device is adapted to detect whether power is received from the second PSE device and to provide power to the emergency lighting device based on the second power via the second fire-resistant PoE connection, if it has been detected that power has been received from the second PSE device; and wherein the PSE device is further adapted to provide power to the non-emergency lighting device based on the first power, if it has not been detected that power has been received from the second PSE device. Wherein the second PSE device is adapted to provide control data via the first fire-resistant PoE connection to the first PSE device for controlling the non-emergency lighting device, and wherein the PSE device is adapted to consider the provided control data only, if no power is received from the second PSE device.

In a further aspect of the present invention a control method for controlling a PoE lighting system as defined in claim 1 is presented, wherein the control method is adapted to control the PoE lighting system such that: the second PSE device provides the second power to the first PSE device via the first fire-resistant PoE connection in case of emergency, the first PSE device detects whether power is received from the second PSE device and provides power to the emergency lighting device based on the second power via the second fire-resistant PoE connection, if it has been detected that power has been received from the second PSE device; and the second PSE device provides control data via the first fire-resistant PoE connection to the first PSE device for controlling the non-emergency lighting device, the first PSE device provides power to the non-emergency lighting device based on the first power, if it has not been detected that power has been received from the second PSE device, and the first PSE device is adapted to consider the provided control data only, if no power is received from the second PSE device.

In a further aspect of the present invention a computer program for controlling a PoE lighting system as defined in claim 1 is presented, wherein the computer program comprises program code means for causing the PoE lighting system to carry out the control method as defined in claim 13, when the computer program is run on the PoE lighting system.

The computer program is preferentially adapted to be executed on one or several controllers of the PoE lighting system. The computer program can be partly implemented on a first controller and partly implemented on one or several other controllers, in order to cause the PoE lighting system to carry out the control method. In particular, a part of the computer program can be implemented on a controller of the first PSE device and another part of the computer program can be implemented on a controller of the second PSE device, wherein these programmed controllers can control the PoE lighting system in accordance with the control method.

It shall be understood that the PoE lighting system of claim 1, the PSE devices of claims 11 and 12, the control method of claim 13 and the computer program of claim 14 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
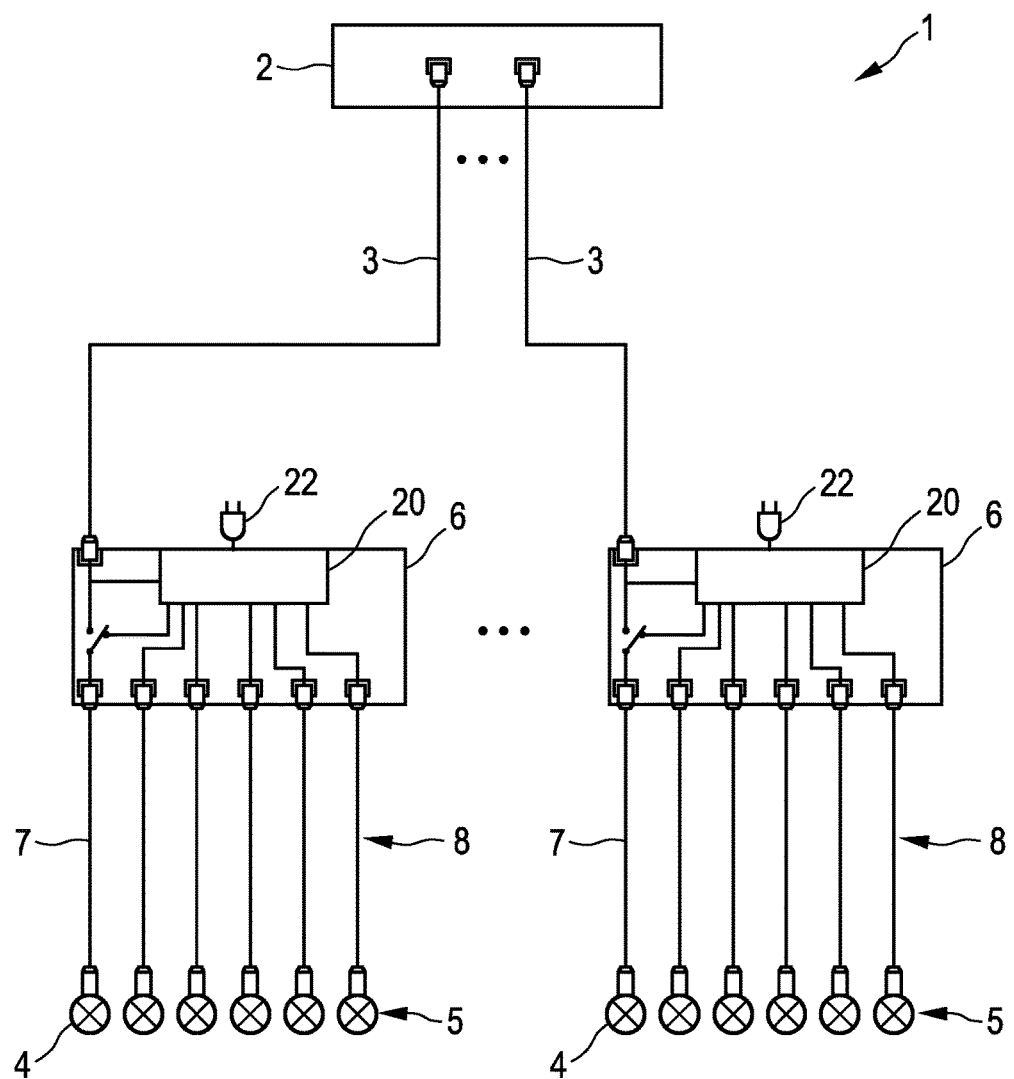
FIG. 1 shows schematically and exemplarily an embodiment of a PoE lighting system.

FIG. 1 shows schematically and exemplarily an embodiment of a PoE lighting system. The PoE lighting system 1 comprises several first PSE devices 6 connected to a second PSE device 2 via fire-resistant Ethernet cables 3. Each first PSE device 6 is connected to an emergency lighting device 4 and several non-emergency lighting devices 5 via Ethernet cables 7, 8, wherein the Ethernet cables 7 for connecting the first PSE devices 6 with the emergency lighting devices 4 are fire-resistant and the Ethernet cables 8 for connecting the first PSE devices 6 with the non-emergency lighting devices 5 are not fire-resistant. Preferentially, the fire-resistance refers to the ability of the first and second PoE connections to provide power in case of fire, whereas the data provision may be strongly influenced by the heat generated by the fire due to a changing impedance of the PoE connections. In particular, the fire-resistant PoE connections may be adapted to provide power for at least 15, 30, 60, 90 or 120 minutes in a standardized fire condition as defined by the European Committee for Electrotechnical Standardization (CENELEC) and/or as defined by the International Electrotechnical Commission (IEC). For instance, the fire-resistant PoE connections may be adapted to provide power for at least 15, 30, 60, 90 or 120 minutes in a fire condition as defined by IEC 60331-23.

Each first PSE device 6 comprises a data and power distributor 20 for receiving power from a first power source being in this embodiment a mains power source via a plug 22 and for distributing the received first power among the non-emergency lighting devices 5. The data and power distributor 20 is preferentially adapted to transform the received first power to the power required by the non-emergency lighting devices 5. Since the data and power distributor 20 provides the power to the non-emergency lighting devices 5 it can also be regarded as being a PSU or as having a power distributing component being the PSU.

Figure 2:
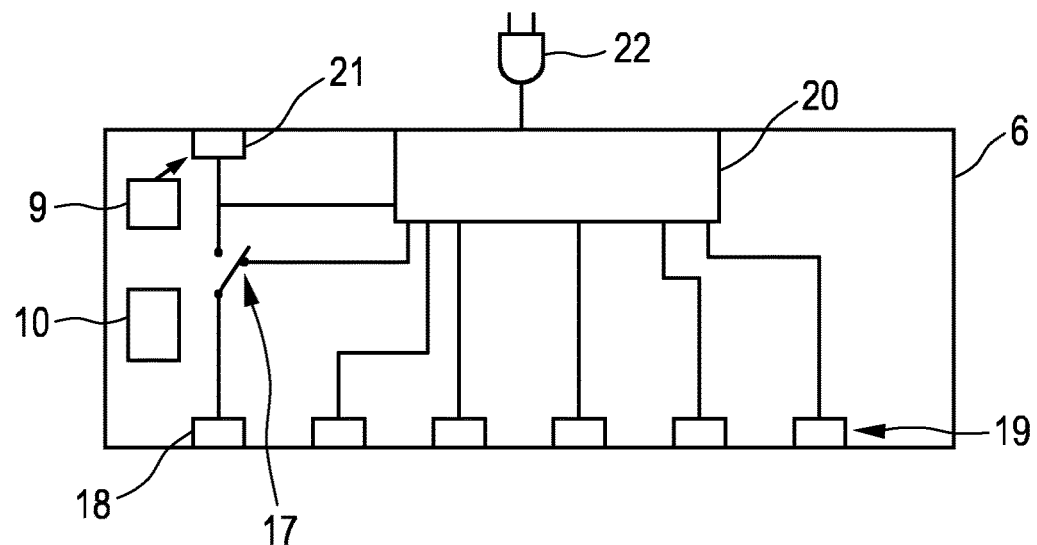
FIG. 2 shows schematically and exemplarily an embodiment of a first PSE device of the PoE lighting system.

The data and power distributor 20 is further adapted to receive control data for controlling the non-emergency lighting devices 5 from the second PSE device 2 and for providing the received control data to the respective non-emergency lighting devices 5 such that the non-emergency lighting devices 5 are controlled accordingly. An embodiment of the first PSE device 6 is exemplarily and schematically shown in more detail in FIG. 2.

The first PSE device 6 comprises an emergency connector 18 for connecting the emergency lighting device 4 and non-emergency connectors 19 for connecting the non-emergency lighting devices 5. The first PSE device 6 further comprises a connector 21 for being connected to the second PSE device 2 via the respective first fire-resistant Ethernet cable 3. The first PSE device 6 further comprises a switch 17 for connecting the emergency connector 18 either to the data and power distributor 20 or to the connector 21 and a detector 9 for detecting whether second power is received from the second PSE device 2. Moreover, the first PSE device 6 comprises a controller 10 for controlling the different components of the first PSE device 6. In particular, the controller 10 is adapted to control the switch 17 such that, if no second power is received from the second PSE device 2, the emergency connector 18 is connected to the data and power distributor 20, in order to allow the emergency lighting device 4 to receive power from the data and power distributor 20, in particular from the PSU, and that the emergency connector 18 is connected to the connector 21, if the second power is received from the second PSE device 2, in order to allow the emergency lighting device 4 to receive the second power from the second PSE device 2. In another embodiment the switch 17 may be adapted and controlled such that, if no second power is received from the second PSE device 2, the emergency connector 18 does not receive power from the data and power distributor 20 such that the emergency lighting device 4 is only provided with power in case of emergency, i.e. if the second power is received from the second PSE device 2.

Figure 3:
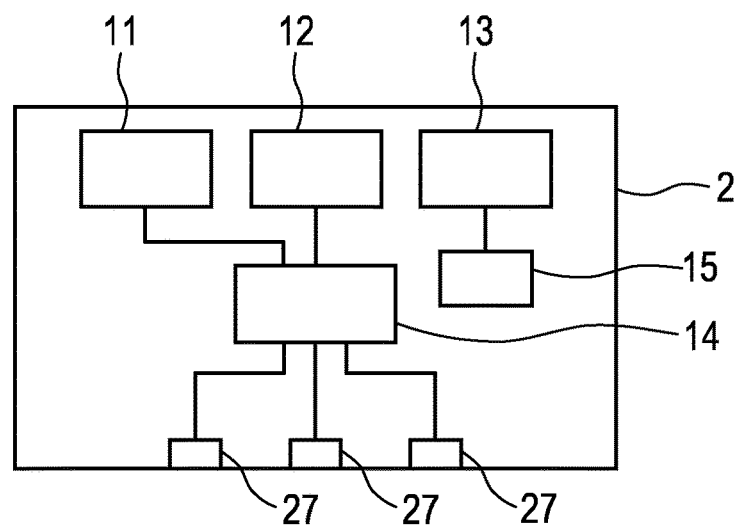
FIG. 3 shows schematically and exemplarily an embodiment of a second PSE device of the PoE lighting system.

An embodiment of the second PSE device 2 is schematically and exemplarily shown in more detail in FIG. 3.

The second PSE device 2 comprises a control data providing unit 11 for providing control data for controlling the non-emergency lighting devices 5 and optionally also the emergency lighting devices 4, wherein the provided control data are distributed among connectors 27 and hence among the first PSE devices 6 by using a data and power distributor 14. It should be noted that FIG. 3 exemplarily shows only three connectors 27 for clarity reasons, wherein in fact the second PSE device 2 comprises of course at least as many connectors 27 as needed for connecting the second PSE device 2 to the several first PSE devices 6.

The control data providing unit 11 can be a storing unit in which control data defining desired lighting configurations are stored and from which these control data can be received for providing the same. The control data providing unit 11 can also be a receiving unit for receiving control data defining a desired lighting configuration from, for instance, a user interface or another unit like a building management system and for providing the received control data. The control data providing unit 11 can also be adapted to generate control data based on a desired lighting configuration which may be predefined or which may be input by a user via a user interface.

The second PSE device 2 further comprises a power providing unit 12 for providing power to the data and power distributor 14 which distributes the power as the respective second power among the connectors 27. The power providing unit 12 can be a power receiving unit comprising a power connector for receiving power from a power source like a mains power source or another power source and for providing the received power to the data and power distributor 20. The power providing unit 12 can also be itself a power source like a battery, especially a rechargeable battery.

The second PSE device 2 further comprises an emergency signal providing unit 13 for providing an emergency signal in case of emergency, especially in case of fire. The emergency signal providing unit 13 can be a receiving unit for receiving an emergency signal in case of emergency and for providing the received emergency signal 2 to, for example, a controller 15 controlling the components of the second PSE device 2. The emergency signal providing unit 13 can receive the emergency signal from, for instance, a building management system, a fire alarm system or another unit. The emergency signal providing unit 13 may also be adapted to receive the emergency signal from a user interface allowing a user to indicate that an emergency situation is present. The emergency signal providing unit 13 can also be adapted to detect an emergency situation like a fire and to generate the emergency signal, after it has detected the emergency situation.

The controller 15 is adapted to control the second PSE device 2 such that the second power is provided to the first PSE device 6 only, if the emergency signal providing unit 13 has provided an emergency signal. Thus, the second PSE device 2 is adapted to indicate the emergency situation by providing the second power to the first PSE devices 6.

The control data for controlling the lighting devices are provided by the second PSE device 2 to the first PSE devices 6, if the emergency signal providing unit 13 has not provided an emergency signal. In an embodiment the second PSE device 2 is adapted to provide the control data to the first PSE device 6 only, if the emergency signal providing unit 13 has not provided an emergency signal. If in another embodiment the second PSE device 2 is adapted to still provide control data, if the emergency signal providing unit 13 has provided an emergency signal, the first PSE devices 6 are preferentially adapted to not consider the provided control data in this situation. Thus, the first PSE devices 6 may be adapted to consider the provided control data only, if no power is received from the second PSE device 2.

Figure 4:
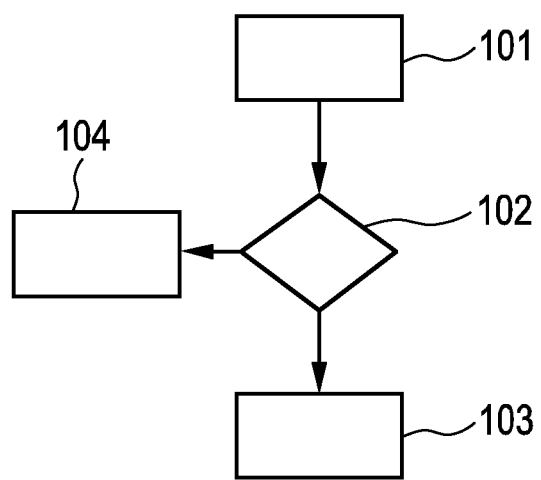
FIG. 4 shows a flowchart exemplarily illustrating an embodiment of a control method for controlling the PoE lighting system.

In the following an embodiment of a control method for controlling a PoE lighting system will exemplarily be described with reference to a flowchart shown in FIG. 4.

In step 101 the second PSE device 2 provides control data for controlling the non-emergency lighting devices 5 and no second power to the first PSE devices 6, if the emergency signal providing unit 13 has not provided an emergency signal. If the emergency signal providing unit 13 has provided an emergency signal, the second power is provided to the first PSE devices 6 and control data for controlling the non-emergency lighting devices 5 are not provided to the first PSE devices 6.

In step 102 the respective first PSE device 6 checks whether power is received from the second PSE device 2 or not. If power is not received from the second PSE device 2, the control method continuous with step 103 in which the respective first PSE device 6 uses the first power for powering the non-emergency lighting devices 5, wherein the non-emergency lighting devices 5 are controlled in accordance with the control data received from the second PSE device 2. If in step 102 it is detected that power is received from the second PSE device 2, the control method continuous with step 104 in which the emergency lighting device 4 is powered by using the power received from the second PSE device 2.

Since in case of high temperatures, which may be caused by a fire, the fire-resistant Ethernet cables 3, 7 can still provide power, but the transmission of data becomes unreliable, the PoE lighting system 1 is preferentially adapted to use only the power transmission functionality of the fire-resistant Ethernet cables 3, 7 in case of emergency and not the data transmission functionality. The second PSE device 2 may be arranged in a remote location like a remote data center which is likely not affected by fire, if fire prevents the normal operation of the first PSE devices 6. If the second PSE device 2 is arranged at a remote location relative to the first PSE devices 6, the emergency signal providing unit 13 may be adapted to receive an indication indicating a fire influencing the first PSE devices 6 from another unit like a building management system or a fire alarm system. Since in this example the second PSE device 2 is arranged at a remote location which is less likely affected by a fire influencing the first PSE devices 6 and since the second PSE device 2 is connected to the emergency lighting devices 4 via the fire-resistant Ethernet cables 3, 7, even in case of a fire influencing the first PSE devices 6 emergency light can be provided.

The PoE lighting system can be adapted such that the non-emergency lighting devices are dimmed automatically, if the second power, which may be regarded as being emergency power, is received from the second PSE device. The automatic dimming can be performed, for instance, by the respective first PSE device. The dimming process can use a Link Layer Discovery Protocol (LLDP), wherein the power received from the second PoE device can also be used to supply the normal, non-emergency lighting devices. It is also possible to use the emergency power received from the second PSE device for allowing the non-emergency lighting devices to remain in a standby mode or passive operational mode, in which they request to receive less power, which may be regarded as being standby power or passive operational mode power, for instance, via LLDP as long as possible via the non-fire-resistant PoE connections, wherein in this case the non-emergency lighting devices may not provide light, but only remain in their standby or passive operational modes. For instance, the non-emergency lighting devices may not only provide a lighting functionality, but also a sensing functionality, wherein the sensing functionality may include sensing the presence of persons and/or sensing heat by using, for example, a flux sensor and wherein in their passive operational modes the lighting functionality may be switched off, but the sensing functionality may be still enabled. The sensing information may be used by, for instance, a building management system for determining locations of people and/or of flames.

The emergency lighting devices can be adapted to be operated in a normal mode and in an emergency mode, wherein in the emergency mode the emergency lighting devices consume less power than in the normal mode. For instance, in the normal mode the emergency lighting devices can provide light having an intensity which is higher than the intensity of the light provided by the emergency lighting devices in the emergency mode. In case of emergency the light intensity level of the emergency lighting devices may be set by using control data provided by the second PSE device via the first and second fire-resistant PoE connections to the emergency lighting devices. Also for setting the emergency lighting devices to the lower energy consumption in case of emergency LLDP may be used.

The data and power distributor used in the respective first PSE device and/or the data and power distributor used in the second PSE device can comprise separate components for data distribution and for power distribution, wherein the component for power distribution can be regarded as being a PSU. However, the data distribution functionality and the power distribution functionality can also be integrated in a same component. The second PSE device can be arranged in a fire safe location such that even in case of fire power can be provided to the emergency lighting devices via the fire-resistant Ethernet cables.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or devices may fulfill the functions of several items recited in the claims. The mere fact that certain measures are recited in mutually different dependent claims does not indicate that a combination of these measures cannot be used to advantage.

Procedures like detecting whether power is received from the second PSE device, providing power to the first PSE devices, providing power to the emergency lighting devices, providing power to the non-emergency lighting devices, et cetera performed by one or several units or devices can be performed by any other number of units or devices. These procedures and/or the control of the PoE lighting system in accordance with the control method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a PoE lighting system comprising an emergency lighting device, a first PSE device and a second PSE device. The first PSE device is adapted to provide power based on a) first power received from a first power source or b) second power received from a second PSE device via a first fire-resistant PoE connection in case of emergency. The first PSE device is adapted to detect whether power is received from the second PSE device and to provide power to the emergency lighting device based on the second power via a second fire-resistant PoE connection, if it has been detected that power has been received from the second PSE device. This can allow for a provision of PoE emergency lighting in case of fire, even if a communication via the fire-resistant PoE connections is not possible anymore.

The invention claimed is:

1. A Power-over-Ethernet (PoE) lighting system comprising:
   a first power source equipment (PSE) device, wherein the first PSE device is adapted to provide power based on:
      a first power received from a first power source or
      a second power received from a second PSE device,
   the second PSE device for providing the second power to the first PSE device via a first fire-resistant PoE connection in case of emergency,
   an emergency lighting device, coupled to the first PSE device via a second fire-resistant PoE connection,
   a non-emergency lighting device,
   wherein the first PSE device is adapted to detect whether power is received from the second PSE device, and
   wherein the first PSE device is further adapted to:
      provide power to the emergency lighting device based on the second power via the second fire-resistant PoE connection, if it has been detected that power has been received from the second PSE device,
      provide power to the non-emergency lighting device based on the first power, if it has not been detected that power has been received from the second PSE device, wherein the second PSE device is adapted to provide control data via the first fire-resistant PoE connection to the first PSE device for controlling the non-emergency lighting device, and wherein the first PSE device is adapted to consider the provided control data only, if no power is received from the second PSE device.

2. The PoE lighting system as defined in claim 1, wherein the second PSE device is adapted to provide control data to the first PSE device only, if it does not provide the second power to the first PSE device.

3. The PoE lighting system as defined in claim 1, wherein the first PSE device is adapted to, if it has been detected that the second power has been received, provide power to the non-emergency lighting device based on the second power.

4. The PoE lighting system as defined in claim 1, wherein the power connection connecting the non-emergency lighting device with the first PSE device is a non-fire-resistant power connection.

5. The PoE lighting system as defined in claim 1, wherein the first PSE device is adapted to provide power to the emergency lighting device based on the first power, if no power is received from the second power source.

6. The PoE lighting system as defined in claim 1, wherein the first power source is a mains power source.

7. A PSE device suitable for being used as a first PSE device in a PoE lighting system as defined in claim 1, wherein the PSE device is adapted to provide power based on:
   the first power received from the first power source, or
   the second power received from the second PSE device,
   wherein the PSE device is adapted to detect whether power is received from the second PSE device,
   wherein the PSE device is further adapted to:
      provide power to the emergency lighting device based on the second power via the second fire-resistant PoE connection, if it has been detected that power has been received from the second PSE device, and
      provide power to the non-emergency lighting device based on the first power, if it has not been detected that power has been received from the second PSE device;
   wherein the second PSE device is adapted to provide control data via the first fire-resistant PoE connection to the first PSE device for controlling the non-emergency lighting device, and wherein the PSE device is adapted to consider the provided control data only, if no power is received from the second PSE device.

8. A control method for controlling a Power-over-Ethernet (PoE) lighting system, the PoE lighting system comprising:
   a first power source equipment (PSE) device, wherein the first PSE device is adapted to provide power based on:
      a first power received from a first power source or
      a second power received from a second PSE device,
   the second PSE device for providing the second power to the first PSE device via a first fire-resistant PoE connection in case of emergency,
   an emergency lighting device, coupled to the first PSE device via a second fire-resistant PoE connection,
   a non-emergency lighting device;
   the control method being adapted to control the PoE lighting system such that:
      the second PSE device provides the second power to the first PSE device via the first fire-resistant PoE connection in case of emergency,
      the second PSE device provides control data via the first fire-resistant PoE connection to the first PSE device for controlling the non-emergency lighting device,
      the first PSE device detects whether power is received from the second PSE device,
      the first PSE device provides power to the emergency lighting device based on the second power via the second fire-resistant PoE connection, if it has been detected that power has been received from the second PSE device, the first PSE device provides power to the non-emergency lighting device based on the first power, if it has not been detected that power has been received from the second PSE device, and the first PSE device is adapted to consider the provided control data only, if no power is received from the second PSE device.

9. A non-transitory computer readable medium including a computer program for controlling a PoE lighting system, the computer program comprising program code for causing the PoE lighting system to carry out the control method as defined in claim 8.

* * * * *